(12) United States Patent
Suzuki

(10) Patent No.: US 6,223,715 B1
(45) Date of Patent: May 1, 2001

(54) COMBUSTION CHAMBER FOR DIRECT INJECTED ENGINE

(75) Inventor: Yuichi Suzuki, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/246,343

(22) Filed: Feb. 8, 1999

(30) Foreign Application Priority Data

Mar. 23, 1998 (JP) .................................................. 10-093972

(51) Int. Cl.$^7$ ....................................................... F02B 23/10
(52) U.S. Cl. ........................ 123/294; 123/276; 123/298; 123/301
(58) Field of Search ................................... 123/295, 294, 123/305, 298, 276, 279, 260, 261, 301

(56) References Cited

U.S. PATENT DOCUMENTS

| 4,958,604 | | 9/1990 | Hashimoto ............................ 123/276 |
| 5,115,774 | | 5/1992 | Nakamura et al. ................... 123/276 |
| 5,327,864 | | 7/1994 | Regueiro .............................. 123/260 |
| 5,553,588 | * | 9/1996 | Gono et al. ........................... 123/276 |
| 5,709,190 | | 1/1998 | Suzuki ................................. 123/302 |
| 5,806,482 | * | 9/1998 | Igarashi et al. ...................... 123/276 |
| 5,943,993 | * | 8/1999 | Carstensen et al. ................. 123/298 |
| 5,960,766 | * | 10/1999 | Hellmich ............................. 123/295 |
| 5,979,399 | * | 11/1999 | Piock et al. .......................... 123/301 |
| 5,996,548 | * | 12/1999 | Hellmich ............................. 123/295 |
| 6,003,488 | * | 12/1999 | Roth .................................... 123/298 |
| 6,035,822 | * | 3/2000 | Suzuki et al. ........................ 123/276 |

FOREIGN PATENT DOCUMENTS

| 0 558 072 | 9/1993 | (EP) . |
| 0 694 682 | 1/1996 | (EP) . |
| 1108771 | 4/1968 | (GB) . |

OTHER PUBLICATIONS

European Search Report dated Jul. 7, 2000.

* cited by examiner

Primary Examiner—Henry C. Yuen
Assistant Examiner—Hieu T Vo
(74) Attorney, Agent, or Firm—Ernest A. Beutler

(57) ABSTRACT

A number of embodiments of combustion chamber configurations for direct injected internal combustion engine. Each embodiment employs a bowl in the head of the piston which is offset to one side of the piston and the fuel injector sprays into the peripheral edge of the bowl and toward the axis of the piston. The bowl configuration is such that the injected fuel is swept upwardly toward the center of the piston and toward a downwardly-facing spark gap mounted above the piston in the cylinder head so as to ensure the presence of a stoichiometric mixture at the time of firing, regardless of the amount of fuel injected.

20 Claims, 7 Drawing Sheets

COMBUSTION CHAMBER FOR DIRECT INJECTED ENGINE

BACKGROUND OF THE INVENTION

This invention relates to a direct injected, internal combustion engine and more particularly to an improved combustion chamber configuration for such engines.

In the interest of improving engine performance both in the terms of power output, fuel economy and exhaust emission control, it has been proposed to employ direct cylinder fuel injection. Fuel injection, per se, offers greater control over the amount of fuel introduced into the combustion chamber on each cycle of operation. By exercising such greater control, it is possible to adjust the amount of fuel injected on a cycle-by-cycle and cylinder-by-cylinder basis to improve engine economy and emission control.

Even additional improvements and performance can be obtained if direct cylinder injection is employed. If the fuel is injected directly into the cylinder and can be stratified under at least some running conditions, then substantial improvements in fuel economy and exhaust emission control can be achieved. Particularly this is very effective in reducing the emission of unburned hydrocarbons (HC).

The term "stratification" refers to the formation of a non-homogeneous fuel air mixture in the combustion chamber. If the entire combustion chamber is filled with a homogeneous mixture and one which is stoichiometric, then more fuel will be present in the combustion chamber than necessary to obtain the requisite power under most engine running conditions. This obviously gives high HC emissions under less than full load running. Therefore, if a stoichiometric patch can be formed in the combustion chamber and located so that it can be ignited at the appropriate time, it will be unnecessary to completely fill the combustion chamber with a homogeneous mixture. This presents obvious advantages in both fuel economy and exhaust emission control.

However, the condition in the combustion chamber is such that it is difficult to ensure that a stoichiometric patch will be located at the spark plug at the time of ignition, particularly under light loads or even at idle. The reasons for this is that there is motion that occurs within the combustion chamber regardless of the configuration of the combustion chamber and the porting arrangement which serves it. This air motion within the combustion chamber causes the fuel patch not only to move but also to disperse. Thus, it has been very difficult if not impossible to obtain stratification in an open combustion chamber.

Of course, if small, pre-combustion chambers are employed then a stratified, stoichiometric charge can be introduced into this restricted pre-combustion chamber and fired by a spark plug position therein. However, the use of such pre-chambers causes pumping losses which can adversely affect engine performance, particularly at higher speeds and higher loads.

A wide variety of types of combustion chambers have been proposed so as to achieve open cylinder stratification. These combustion chambers normally use bowls that are formed in the head of the piston and into which the fuel is introduced. If the spark plug is positioned so that its gap extends into the bowl the thought it that there will be a homogeneous stoichiometric mixture present at spark gap at the time of firing. However, in practice this result is not always easy to obtain.

Therefore, various bowl formations have been proposed some of which include, in addition to a main bowl, a pocket or recess in an area of the bowl into which the spark gap extends. With conventional center gaped spark plugs, where the spark gap extends axially in the cylinder, this means that the spark gap will be exposed to the interior of the pocket. By then causing the fuel mixture to accumulate in the pocket stratification can be achieved and firing improved theoretically.

There are, however, particular problems within ensuring that these combustion chambers will operate satisfactorily under all engine running conditions. Also, by extending the spark plug into the bottom of the bowl there is a risk that under certain conditions the side spark terminal may be struck by the piston and close the gap rendering further running impossible. Also the side terminal shields the center terminal and gap from the fuel/air patch.

It is, therefore, a principal object of this invention to provide an improved combustion chamber for a direct injected engine wherein stratification can be achieved and wherein extended gaps for the spark plugs are not required.

It is a further object of this invention to provide an improved configuration for a combustion chamber that embodies a bowl in the piston and which cooperates with the spark plug so that the bowl directs the flow of fuel toward the spark gap upon the compression stroke to ensure the presence of a stoichiometric mixture in an open gap at the time of firing.

SUMMARY OF THE INVENTION

This invention is adapted to be embodied in an internal combustion engine having a cylinder bore closed at one end by a cylinder head. A piston reciprocates in the cylinder bore and forms with the cylinder bore and the cylinder head at least one combustion chamber. At least a pair of intake ports are formed on one side of a plane containing the axis of the cylinder bore for admitting a charge to the combustion chamber. At least a pair of exhaust ports are formed on the other side of the plane containing the cylinder bore axis for discharge of burnt combustion products from the combustion chamber. A fuel injector is provided at one side of the cylinder bore and disposed so that its spray axis extends toward the plane containing the cylinder bore axis. A recess is formed in the head of the piston that lies substantially on this one side of the plane containing the cylinder bore axis. A spark plug is mounted in the cylinder head and has an open gap that faces generally downwardly toward the head of the piston and which is disposed in an area above the periphery of the piston head recess for receiving fuel that is swept upwardly from the recess toward the cylinder head for ignition thereof when the spark plug is fired.

DETAILED DESCRIPTION OF THE PREFERRED EMBODIMENTS OF THE INVENTION

Figure 1:
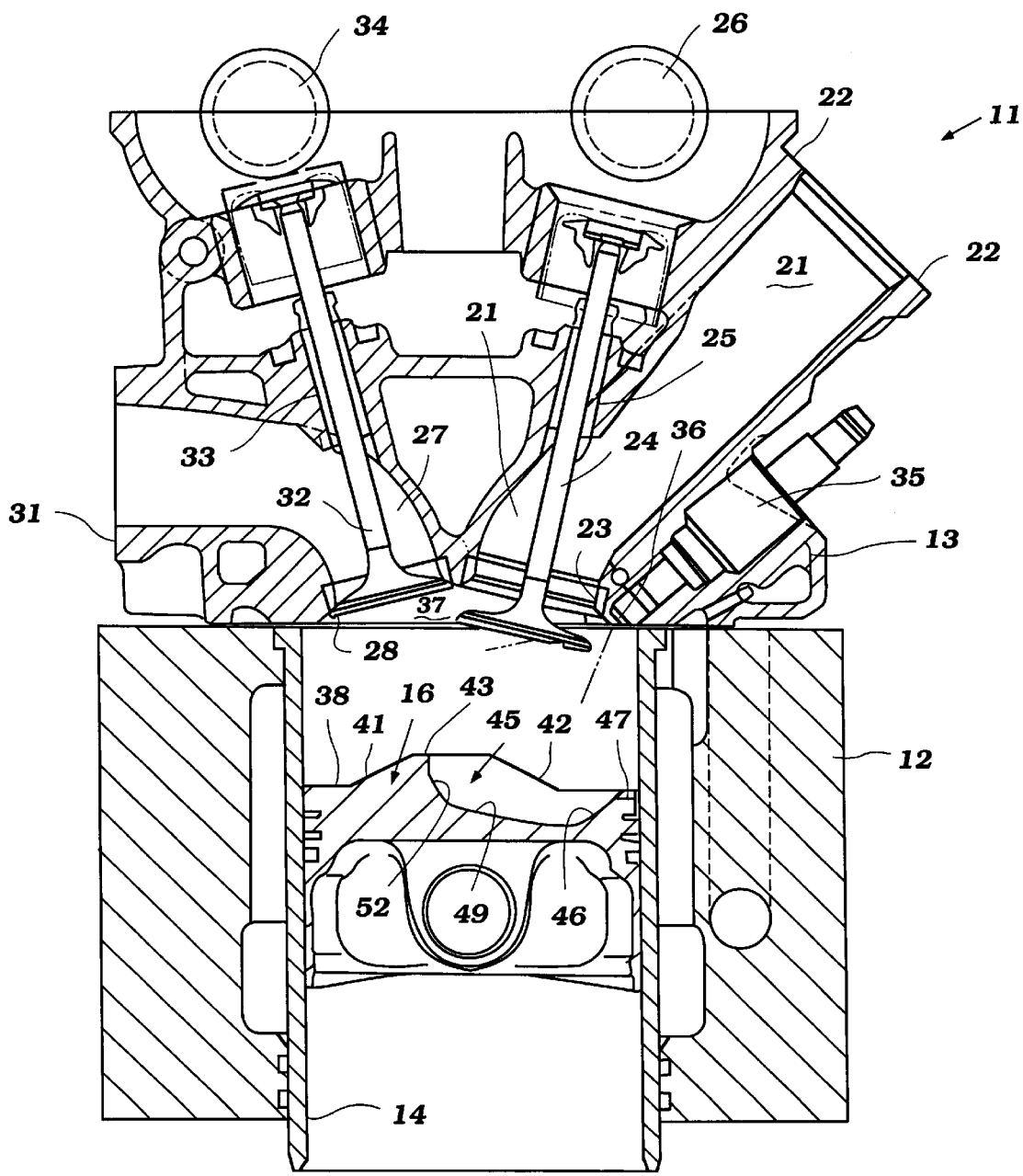
FIG. 1 is a partial cross-sectional view taken generally perpendicular to the crankshaft axis of an engine embodying the invention and shows the cross-sectional configuration of the cylinder bore during a portion of the intake stroke.
Figure 2:
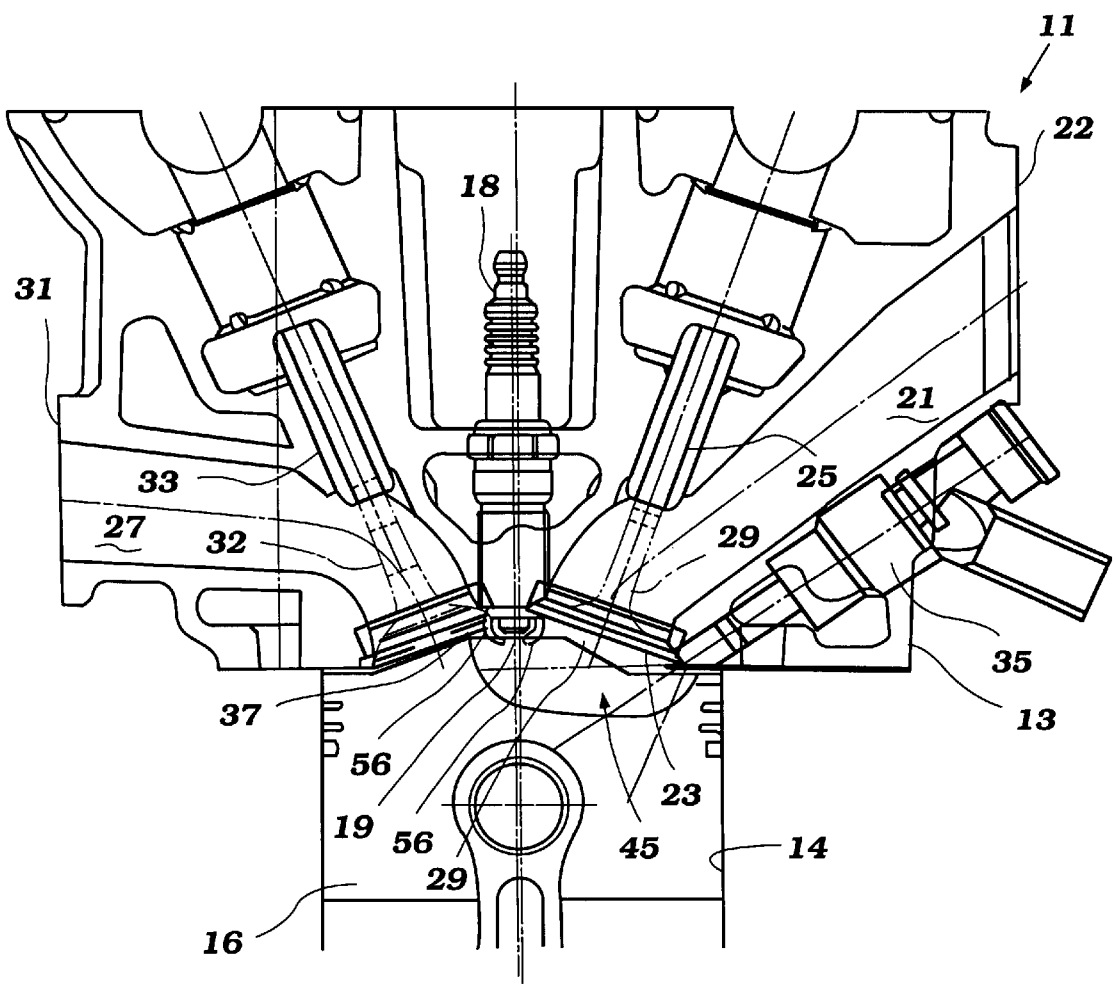
FIG. 2 is a partial cross-sectional view in part similar to FIG. 1, but also shows the spark plug and shows the piston at top dead center at the end of the compression stroke.

Referring now in detail to the drawings and first to the embodiment of FIGS. 1—9, a portion of an internal combustion engine constructed in accordance with this embodiment is indicated generally by the reference numeral 11 and is depicted by means of partial cross-sectional views in FIGS. 1 and 2. Partial views are all that are believed to be required in order to permit those skilled in the art to practice the invention because the invention relates, as afore noted, primarily to the configuration of the combustion chamber of the engine along with the placement of the fuel injector and the placement and type of spark plug employed.

Because of this, illustration of only a top portion of the cylinder block, indicated by the reference numeral 12, and the attached cylinder head, indicated by the reference numeral 13, associated with a single cylinder of the engine are believed to be necessary to permit those skilled in the art to practice the invention. That is, the invention is illustrated in conjunction with a portion of a single cylinder of the engine 11. It will be readily apparent to those skilled in the art how the invention can be practiced with multiple cylinder engines of varying configurations. Also, where any components of the engine 11 are not depicted, they may be considered to be of any conventional or known type.

The cylinder block 12 has a cylinder bore 14 which is formed in the illustrated embodiment, by a liner 15 that is pressed or otherwise fixed within the cylinder block 12. A piston, indicated generally by the reference numeral 16 is supported for reciprocation in the cylinder bore 14.

The piston 16 has piston pin bosses in which piston pin receiving openings 17 are formed so as to afford connection to a connecting rod in a known manner for driving an associated crankshaft. The piston pin, connecting rod and crankshaft are not illustrated in FIG. 1, for the reasons aforenoted. The piston pin and upper end of the connecting rod do appear, however, in FIG. 2.

A spark plug 18 is mounted in the cylinder head 13 so that its center spark terminal 19 is disposed substantially on the axis of the cylinder bore 14. The spark plug 18 is fired by any suitable ignition system in accordance with any desired timing strategy.

Figure 3:
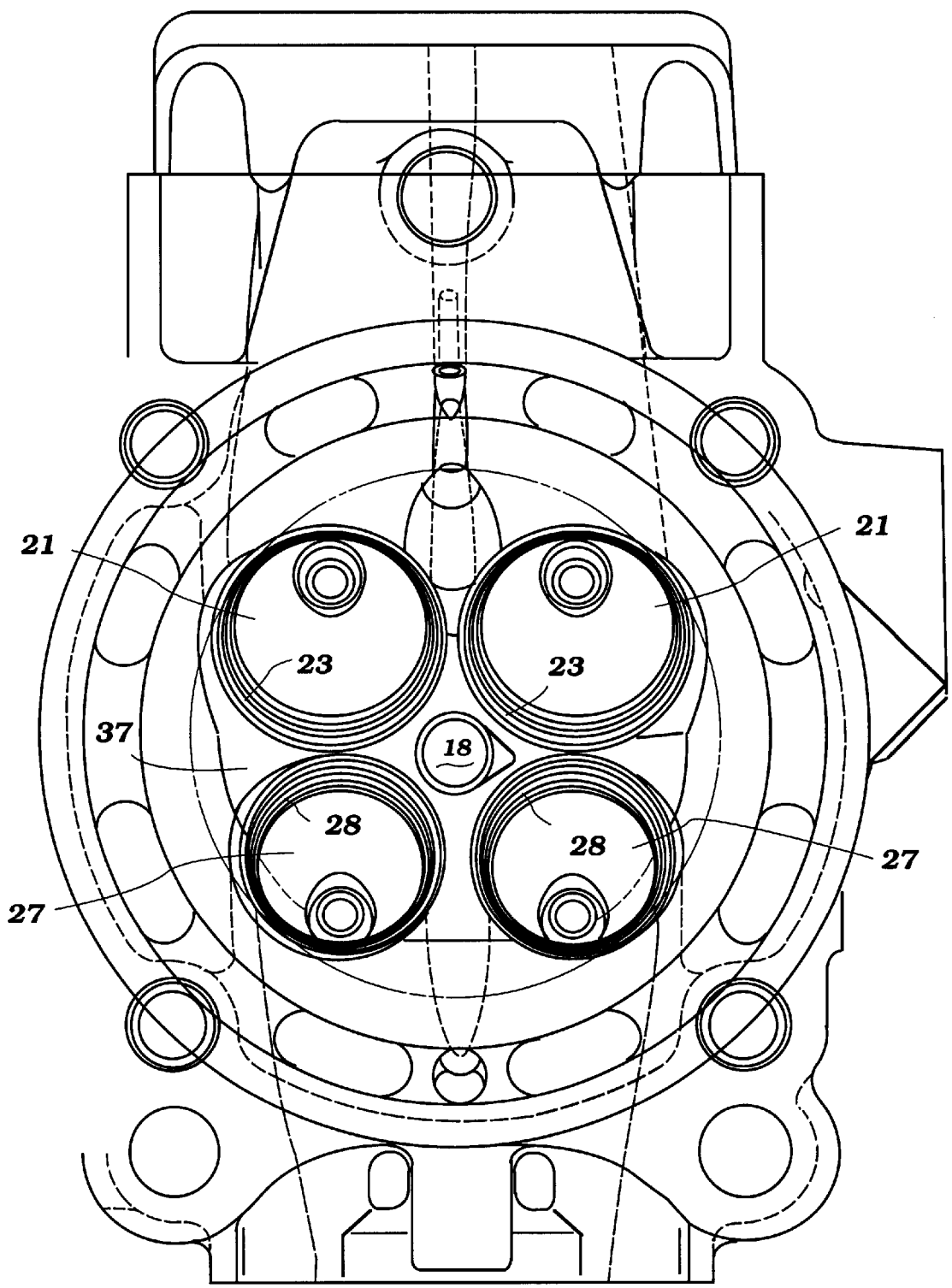
FIG. 3 is a partial bottom plan view of the cylinder head with the intake valves removed.

As may be best seen in FIG. 3, a pair of inlet passages 21 are formed on one side of a plane containing the aforenoted cylinder bore axis. These intake passages 21 extend through the cylinder head from an external surface 22 thereof. Any suitable induction system and manifolding arrangement may be employed in conjunction with the collection of air and supplying it to the cylinder head intake passages 21.

The intake passages 21 terminate in or at intake valve seats 23 which valve seats 23 are valved by poppet type intake valves 24. These intake valves 24 are supported within valve guides 25 and are actuated by means that include an overhead mounted intake cam shaft 26. The valves 24 are urged to their closed positions by spring assemblies and are opened by lobes on the intake cam shaft 26 in a known manner. The intake cam shaft 26 is journaled in the cylinder head 13 in a suitable manner and is driven at one-half crankshaft speed by a suitable timing drive.

If desired, a flow control valve may be positioned in one or both of the intake passages 21 so as to selectively modify the flow direction and flow velocity into the cylinder bore through the intake passage associated with this flow control valve. In one position, normally the wide open throttle or high range condition, this flow control valve will be in an open and non-flow restricting and redirecting position. In the other position, the flow control valve may be positioned to redirect the flow into the combustion chamber and reduce the effective flow area so as to increase its velocity.

If flow control valves are placed in both passages, they may be employed to generate a desired action such as a tumble motion. On the other hand, if a flow control valve is positioned in only one of the intake passages, by closing it, the intake charge will enter the cylinder through the other intake passage and will generate a swirl. Various other types of flow control valves can be employed without departing from the main purpose of the invention.

Exhaust passages 27 are formed in the cylinder head 13 on the opposite side of the aforenoted plane that contains the cylinder bore axis. These exhaust passages 27 originate at exhaust valve seats 28 that communicate the exhaust passages 27 with a combustion chamber 29 formed in part by the head of the piston 16 in a manner which will be described in more detail shortly.

The exhaust passages 27, which are illustrated as being of the Siamesed type, terminate at an outer surface 31 of the cylinder head 13. A suitable exhaust manifold (not shown) is affixed to the cylinder head surface 31 for collecting the exhaust gases and discharging them to the atmosphere.

Poppet type exhaust valves 32 are mounted within valve guides 33 suitably fixed in the cylinder head 13. Like the intake valves 24, the exhaust valves 32 are urged to their closed position by spring assemblies and are opened by the lobes of an exhaust cam shaft 34. The exhaust cam shaft 34, like the intake cam shaft 26 is journaled in the cylinder head 13 and any suitable manner. Also, the exhaust cam shaft 34 is driven at one-half crankshaft speed by a suitable timing drive.

A fuel injector 35 is mounted on the intake side of the cylinder head 13 in an area between and below the intake passages 21. The fuel injector 35 has a nozzle portion 36 that sprays inwardly toward the aforenoted plane containing the cylinder bore axis and toward the head portion of the piston 16.

Preferably, the injector 35 has a conical spray pattern and is of the swirl type. The spray pattern will be described in more detail later. Fuel is supplied to the fuel injector 35 by a suitable fuel supply system including a high pressure pump and fuel rail components which are not shown and may be of any known type.

The cylinder head 13 has a recess 37 formed in the lower face thereof which cooperates with the head of the piston and the cylinder bore 14 to form the combustion chamber 29. The head of the piston has a configuration which may be best understood by reference to FIGS. 4–7.

First, the piston 16 has a generally planar head surface 38 above which a dome, indicated generally by the reference numeral 39 extends. This dome 39 is formed by a pair of generally planar, angularly upwardly inclined side surfaces 41 and 42 formed on the exhaust and intake sides, respectively, that merge into a flat upper portion 43. The sides of the portions 41 and 42 are bounded by generally curved surfaces 44 that merge in rounded areas into the flat upper portion 43 so as to complete the shape of the dome 39.

In addition, a recess or bowl, indicated generally by the reference numeral 45, is formed in the head of the piston 16 and primarily, but not completely, in the dome portion 39. This recess 45 may have a generally oval configuration in top plan view and extends from the flat portion 38 on the intake side of the cylinder head into the upwardly inclined surface 42 and terminating in the flat upper head portion 43.

Preferably, the oval configuration 45 has a larger diameter portion H which is formed at the juncture between a downwardly sloped inlet portion 46 which extends inwardly from a groove or recess 47 which provides a clearance area for the spray from the fuel injector 35. This permits the spray to enter in the pattern as shown by the phantom shaded area 48 in FIG. 4. This spray pattern will also be described in more detail later as will be the injection timing.

The curved portion 46 terminates in an upwardly inclined planar surface 49 which extends through the inclined area 42 and which terminates at a further edge 51 where it joins and upwardly curved surface 52 that opens through the head portion 43. As may be best seen in FIG. 2 which shows the top dead center position of the piston, the center spark terminal 19 is disposed in this general area and overlies the lower portion of the curved portion 52. This is done so as to assist in the direction of the fuel charge toward the center spark terminal 19 at the end of the compression stroke and immediately before the spark plug 18 as fired.

Figure 5:
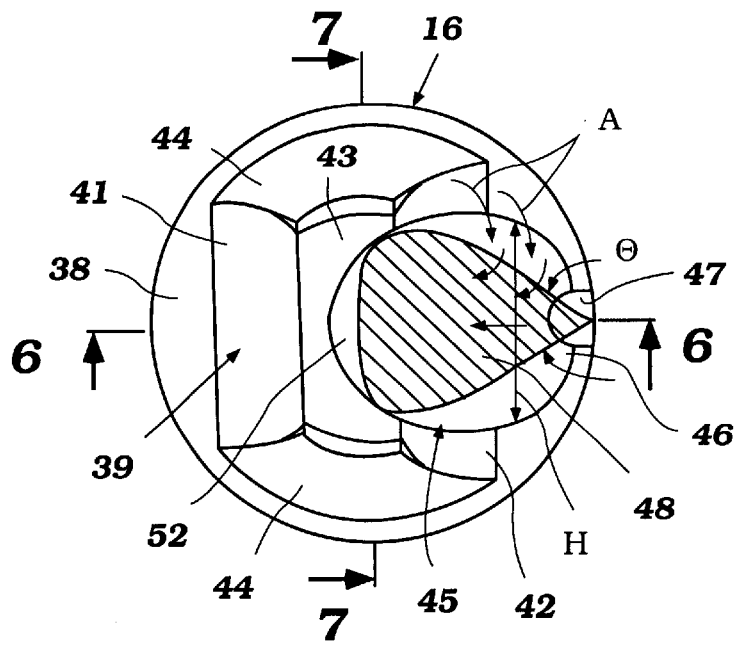
FIG. 5 is a top plan view of the head of the piston, in part similar to FIG. 4 and shows the formation of the fuel patch during the beginning stages of the fuel injection cycle.
Figure 6:
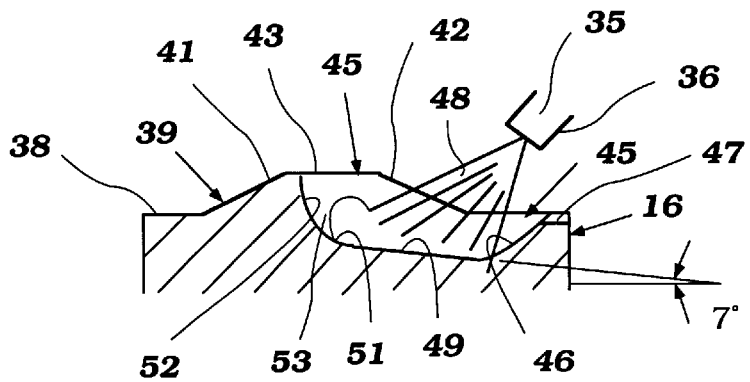
FIG. 6 is a cross-sectional view taken along the line 6—6 of FIG. 5.
Figure 7:
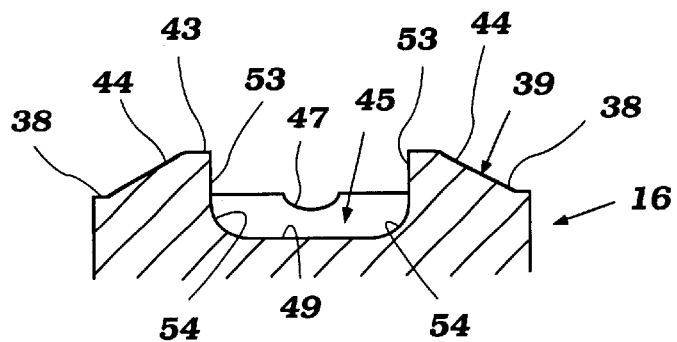
FIG. 7 is a cross-sectional view taken along the line 7—7 of FIG. 5.

The cavity 45 is further defined by a pair of upstanding side walls 53 which mate with the lower wall 49 through curved sections 54 as best seen in FIG. 7. The inclination of the lower wall 49 is disposed at a relatively narrow angle to a horizontal plane and preferably a angle in the range of about 7°. Thus, if fuel is injected during the beginning of the intake cycle as shown in FIGS. 5 and 6, the fuel will tend to collect on the curved walls 46 and the upwardly incline wall 49.

As the piston 16 moves in its upward direction during the compression stroke and toward the end of this stroke, a squish action will be caused partially and this will augment any further motion caused by the aforenoted control valve in the intake system. This may be a swirl as indicated by the arrows A as seen in FIG. 5. This motion will tend to sweep the fuel toward the upwardly inclined wall 49 and to the curved area 52.

Fuel injection is preferably started at a time during the compression stroke under low speed and lower mid-range performance. This will cause the fuel to be swept upwardly by the curved wall 19 toward the center terminal 19 of the spark plug 18 as seen by the shaded area 55 in FIGS. 8 and 9. The spark plug 18 preferably is of the side gap type and thus, has two or three side electrodes 56 (FIGS. 2 and 4) that terminate outwardly of the center electrode 19 so that the spark gap actually travels in a direction perpendicular to the cylinder bore axis. Thus, the spark gap faces downwardly toward the upwardly moving fuel patch 55.

Figure 8:
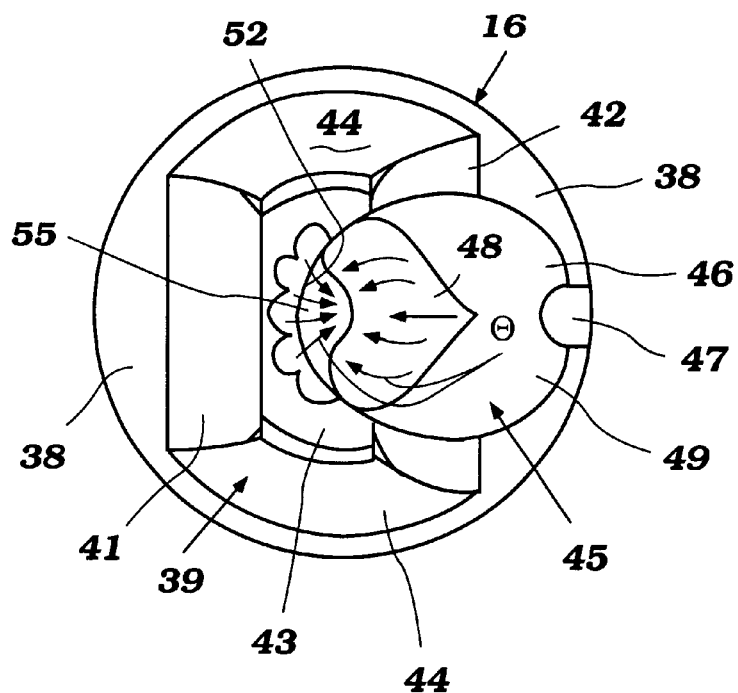
FIG. 8 is a top plan view, in part similar to FIGS. 4 and 5, but shows the condition after fuel injection has been completed and when the piston is approaching top dead center position on the compression stroke.
Figure 9:
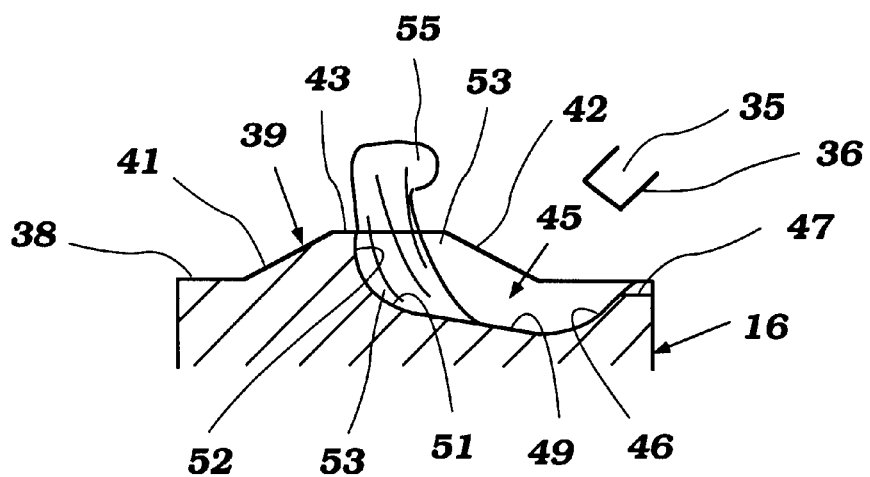
FIG. 9 is a cross-sectional view, in part similar to FIG. 6, but shows the condition during the time when the piston is in the position shown in FIG. 8.

The configuration of the cylinder head is such that as the piston 16 approaches top dead center position as shown in FIGS. 2, 8 and 9, a squish action will occur that drives the fuel patch as shown by the arrows B in this figure centrally toward the spark gaps defined by the terminal 19 and 56. There will be no shielding of the spark gap by the terminals and thus, fuel ignition is ensured.

It has been noted that the shape of the bowl or recess 45 is relatively wide, indicated by the dimension H at the inlet end wherein the spray from the fuel injector 35 and specifically its nozzle 36 is directed. This permits the use of a relatively wide spray cone indicated by the angle θ. This can be in the range of 60°–80° so as to provide a relatively large fuel patch and to permit adequate fuel injection under high speed, high load conditions.

Figure 4:
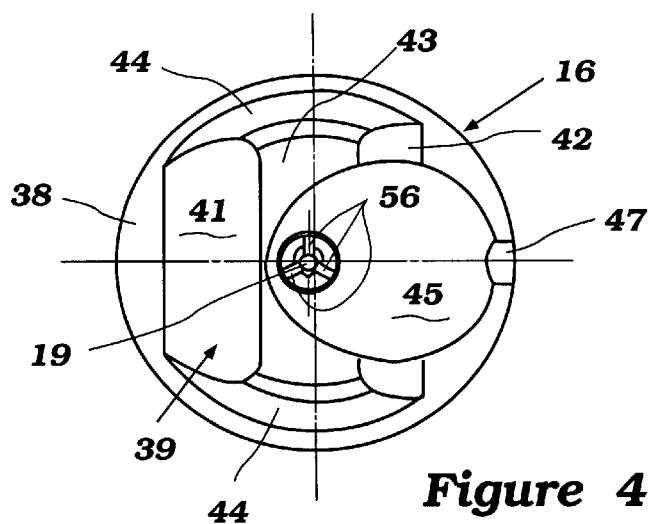
FIG. 4 is a top plan view of the head of the piston and shows the location of the spark plug relative to the piston bowl.

As may be best seen in FIGS. 4 and 7, this patch is introduced initially toward the lower wall 49, but is migrated by the various motions including the air flow in the combustion chamber and the inertia of the fuel so as to move toward the curved wall 52.

As seen in these figures, the oval shape of the bowl tends to narrow toward the center of the piston, and thus the fuel will be collected in this area by the curved shape. This is particularly important under low speed, low load conditions when very small amounts of fuel are injected.

As seen in FIG. 8, this movement of the fuel also causes it to be swept upwardly toward the gap 19 of the spark plug 18, as aforenoted. Thus, it will be ensured that even with small amounts of fuel injection, there will be a stoichiometric mixture present at the gap of the spark plug at the time of firing. Although this type of spray pattern and bowl configuration is desired, other configurations can also be employed so long as the rear side of the bowl directs the fuel flow upwardly toward the downwardly-facing spark gap. Other possible shapes which can be used with the invention are shown in the following embodiments.

Figure 10:
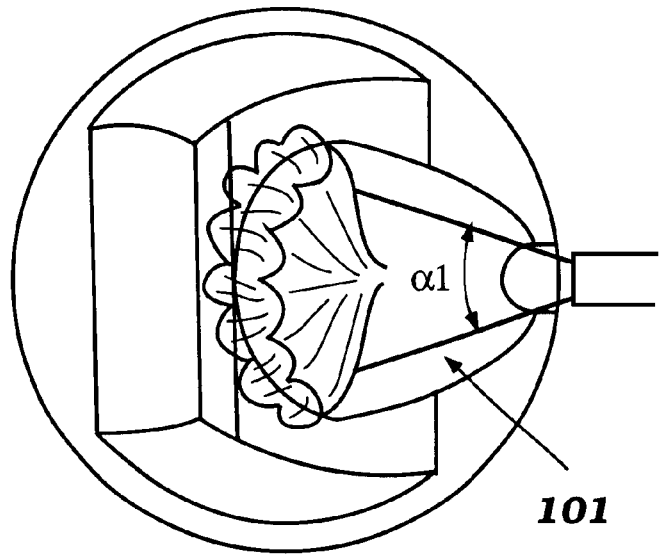
FIG. 10 is a top plan view, in part similar to FIGS. 4, 5 and 8 and shows another embodiment of the invention.

FIGS. 9 and 10 show another embodiment of the invention wherein a somewhat narrower spray pattern is employed. In this embodiment, the conical angle of the spray α1 is smaller than in the previously described and preferred embodiment, and hence the oval shape of the bowl, indicated at 101 in this figure, is somewhat reversed from the previously described and preferred embodiment.

Figure 11:
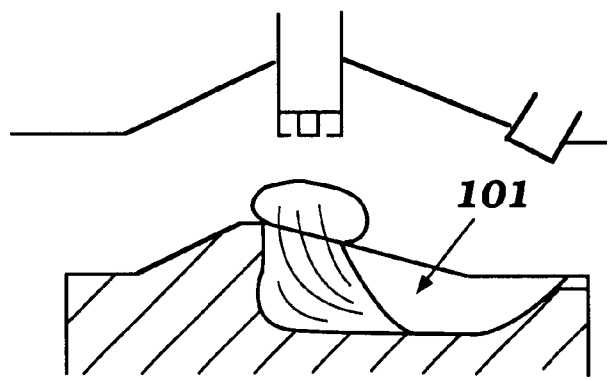
FIG. 11 is a cross-sectional view, in part similar to FIG. 6, but for the embodiment of FIG. 10 and also shows the cylinder head.
Figure 12:
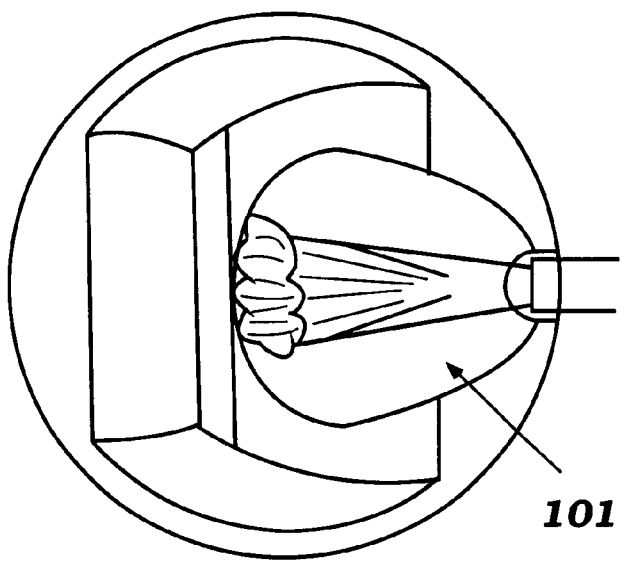
FIG. 12 is a cross-sectional view, in part similar to FIGS. 4, 5, 8 and 10 and shows yet another embodiment of the invention.
Figure 13:
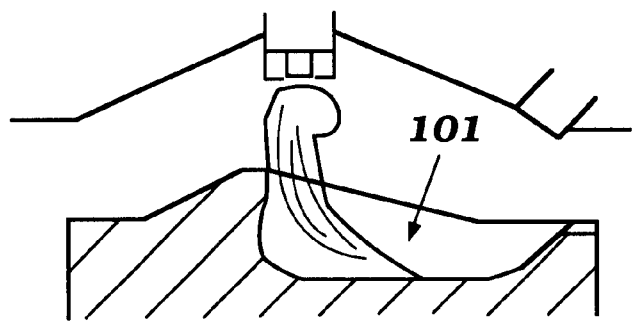
FIG. 13 is a cross-sectional view, in part similar to FIGS. 6 and 11 for this embodiment and also shows the cylinder head in position.

That is, the entrance portion of the bowl 101 is narrower and the exit portion is wider. This tends to cause the fuel to be dispersed more widely and may present some problems in connection with ensuring the presence of a stoichiometric patch at the gap of the spark plug at the time of firing. Thus, with this embodiment, it is quite important to employ the side gap spark plug as seen in FIG. 10. This embodiment will provide a wider fuel patch and thus it will be less likely to be displaced from the area of the spark plug if injection time is advanced. FIGS. 11 and 12 show another embodiment which basically is simillar to the embodiment of FIGS. 9 and 10, but in this embodiment, the spray angle α2 is considerably narrower to further improve the stratification under low speed, low load conditions.

Thus, from the foregoing description, it should be readily apparent that the described embodiments of the invention provide a generally open chamber for a direct injected engine, but nevertheless by the configuration of the bowl in the piston, the spray pattern in the downwardly-facing spark gap, it is possible to ensure stratification even under low speed, low load conditions when very small amounts of fuel are injected. Also, this minimizes the necessity for forming recesses in the bowl into which the spark gap extend in order to ensure tracking of fuel around the spark gap at the time of firing, as with previously proposed constructions.

Of course, the foregoing description is that of preferred embodiments in the invention. Various changes and modifications may be made without departing from the spirit and scope of the invention, as defined by the appended claims.

What is claimed is:

1. A combustion chamber for an internal combustion engine comprised of a cylinder block defining a cylinder bore, a cylinder head closing one end of said cylinder bore, a piston reciprocating in said cylinder bore and forming with said cylinder bore and said cylinder head said combustion chamber, at least a pair of intake ports formed in said cylinder head on one side of a plane containing the axis of said cylinder bore for admitting a charge to said combustion chamber, at least a pair of exhaust ports formed in said cylinder head on the other side of said plane for discharge of burnt combustion products from said combustion chamber, a fuel injector at said one side of said plane and disposed so that its spray axis extends toward said plane, the head of said piston being formed with a dome defined by a flat upper surface that extends substantially perpendicularly to the cylinder bore axis and an inclined surface at one side thereof that merges downwardly into the head of the piston, a recess formed in the head of said piston and lying substantially on said one side of said plane at least in part within said dome and terminating contiguous to said flat upper surface of said dome, a spark plug mounted in said cylinder head and having an open gap facing generally downwardly toward the head of said piston, said spark plug gap being disposed in an area above the periphery of said cylinder head recess for receiving fuel that is swept upwardly from said recess toward said cylinder head for ignition thereof when said spark plug is fired.

2. A combustion chamber for an internal combustion engine as set forth in claim 1 wherein the recess has a generally oval shape when viewed in top plan view.

3. A combustion chamber for an internal combustion engine as set forth in claim 2, wherein one end of the oval is narrower than the other end.

4. A combustion chamber for an internal combustion engine as set forth in claim 3, wherein the narrow end of the oval is juxtaposed to the fuel injector.

5. A combustion chamber for an internal combustion engine as set forth in claim 3, wherein the narrow end of the oval is juxtaposed to the spark plug.

6. A combustion chamber for an internal combustion engine as set forth in claim 1, wherein the dome on the head of the piston is surrounded by a flat area.

7. A combustion chamber for an internal combustion engine as set forth in claim 1, wherein the bowl is formed at least in part in both the flap upper surface and the inclined surface of the dome.

8. A combustion chamber for an internal combustion engine as set forth in claim 7 wherein the recess has a generally oval shape when viewed in top plan view.

9. A combustion chamber for an internal combustion engine as set forth in claim 8, wherein one end of the oval is narrower than the other end.

10. A combustion chamber for an internal combustion engine as set forth in claim 9, wherein the narrow end of the oval is juxtaposed to the fuel injector.

11. A combustion chamber for an internal combustion engine as set forth in claim 9, wherein the narrow end of the oval is juxtaposed to the spark plug.

12. A combustion chamber for an internal combustion engine as set forth in claim 1 wherein the dome is formed in part by a further inclined surface, said inclined surface and said further inclined surface converging toward a line that lies above the flap upper surface of said dome.

13. A combustion chamber for an internal combustion engine as set forth in claim 12, wherein the bowl is formed at least in part in both the flap upper surface and the inclined surface of the dome.

14. A combustion chamber for an internal combustion engine as set forth in claim 13 wherein the recess has a generally oval shape when viewed in top plan view.

15. A combustion chamber for an internal combustion engine as set forth in claim 14, wherein one end of the oval is narrower than the other end.

16. A combustion chamber for an internal combustion engine as set forth in claim 15, wherein the narrow end of the oval is juxtaposed to the fuel injector.

17. A combustion chamber for an internal combustion engine as set forth in claim 15, wherein the narrow end of the oval is juxtaposed to the spark plug.

18. A combustion chamber for an internal combustion engine as set forth in claim 1 wherein the fuel injector has a spray nozzle disposed contiguous to the periphery of the cylinder bore.

19. A combustion chamber for an internal combustion engine as set forth in claim 1 wherein the fuel injector lies below intake passages that serve the intake ports.

20. A combustion chamber for an internal combustion engine as set forth in claim 19 wherein the fuel injector has a spray nozzle disposed contiguous to the periphery of the cylinder bore.

* * * * *